Dec. 13, 1960     C. C. COHN     2,963,760
SLIDE FASTENER AND TREATMENT THEREOF
Filed Sept. 30, 1957     3 Sheets-Sheet 1

INVENTOR.
CHARLES C. COHN
BY
ATTORNEYS

Dec. 13, 1960 C. C. COHN 2,963,760
SLIDE FASTENER AND TREATMENT THEREOF
Filed Sept. 30, 1957 3 Sheets-Sheet 2

INVENTOR.
CHARLES C. COHN
BY
ATTORNEYS

INVENTOR.
CHARLES C. COHN
BY
ATTORNEYS

2,963,760
SLIDE FASTENER AND TREATMENT THEREOF

Charles C. Cohn, Atlantic City, N.J., assignor to Samuel L. Cohn and Charles C. Cohn, copartners, trading as Colonial Alloys Company Filed Sept. 30, 1957, Ser. No. 687,046

3 Claims. (Cl. 24—205.16)

This application relates to slide fasteners and the treatment thereof and, more particularly, to slide fastener construction particularly adapted to be electrolytically treated, to methods of manufacture thereof, and to methods and apparatus for the treatment thereof.

It is common practice in the manufacture of slide fasteners to electrolytically treat the fastener elements, after attachment thereof to a tape, in order to provide for coating or dyeing and sealing of the coated elements. Coating treatments and some dyeing and sealing treatments involve electrochemical operation. These operations are conducted in a bath and it is essential that electrical contact be provided between a source of current and each fastener element on the tape in order that the element be properly electrolytically treated. Common to all presently known processes and apparatus for the electrolytic treatment of slide fasteners is the difficulty of accomplishing suitable uniform electrical contact between an electrode in an electrolytic bath and each of the fastener elements which are to be treated and which are attached to a tape running through the bath.

One expedient commonly employed in an effort to avoid the adverse effects of failure of contact between individual fastener elements on a tape and an electrode in the form of, for example, a conductive drum or belt, over which the tape is passed, is the provision of a thin conductive wire positioned between the fastener elements and the tape. The wire extends from element to element and it is intended that each element will be in conductive contact with the wire. The purpose of this arrangement is to provide conductive contact between successive fastener elements and thus, if one of the elements should fail to engage the electrode, it will receive current through the wire from an adjacent fastener element. However, it not infrequently happens that a fastener element fails to make contact with the wire. This may occur because of the fact that stray insulating fibers or threads of the tape material may extend out and be clamped between a fastener element and the conductive wire when the element is applied to the tape thus insulating the element from the wire. It may occur due to the presence of stray foreign matter between a fastener element and the wire. It may also occur because of the existence of an insulating coating or film such as, for example, an oxide film, existing on either or both the wire and the element.

It is an object of this invention to provide a fastener tape which cannot present stray fibers or threads in positions to be clamped between the wire and individual fastener elements as they are applied to the tape and insulate the elements from the wire.

It is a further object of the invention to provide fastener elements formed so that foreign matter, a thread or fiber, or an insulating film positioned between an element and the wire will be cut by the element and thus contact between each element and the wire will be insured.

When, during the application of fastener elements to a tape, minor dimensional variations exist in the individual elements, the striking apparatus in the fastener element assembling machine, which operates uniformly for each of the successive elements applied thereby to a tape, may not apply slightly under-sized elements to the tape bead with sufficient force to insure contact between the element and the wire. Thus, for example, if aluminum elements and wire are used, the oxide film appearing on the surface of the aluminum may, in some instances, be sufficient to prevent the existence of a proper electrical contact between each element and the wire. It would be impractical to apply a sufficient force to the elements in the machine for assembling the elements to the tape to insure the mechanical breaking of this and similar films.

It is, therefore, a further object of the invention to provide for the supplemental striking of the individual elements after they have been assembled to a tape in order to deform the elements sufficiently to insure uniform contact between the elements and the wire and to insure the mechanical breaking of any insulating films existing between the elements and the wire. The combination of the element formation and the element deformation will insure substantially perfectly uniform contact between all of the elements and the wire.

It is a further object of the invention to provide a slide fastener assembly in which the wire extending between the fastener elements and one of a pair of tapes of an assembled fastener will engage the elements on the other tape. This is accomplished by providing an arching of the wire between the elements clamped thereover. This arching of the wire results not only in the contact of the elements on one tape with the wire of a cooperating tape but also results in the existence of a transverse loading between inter-engaging elements thus insuring electrical contact between the inter-engaging elements.

In the actual process of continuously electrolytically treating slide fasteners, there is conventionally employed a foraminous material providing a surface movable in engagement with elements of a fastener passing through an electrolytic bath. The foraminous material is formed of a conductive material and provides one of the electrodes in the bath. The foraminous material is employed in order to provide free dissipation of gases generated at the electrode surfaces and thus fastener elements do not become insulated from the electrode surface by a gaseous layer. Even with this construction, there is, however, substantial difficulty experienced in insuring uniform and consistent contact between the individual fastener elements and the foraminous electrode.

When an individual element fails to make contact with the electrode and at the same time the individual element fails to make contact either with an adjacent element or with a conductive wire positioned between the tape and the element, that element will obviously not be treated in the bath and, when the tape emerges from the bath, there appears an untreated element which, when the treatment involves coloration of the elements, is obviously extremely noticeable and represents an imperfection in the treated fastener. In view of the fact that great lengths of fasteners are continuously treated by their passage through an electrolyte bath, it will be evident that the occurrence of even an occasional untreated fastener element represents a highly objectional condition giving rise to loss of time, increased costs and, in some instances, waste of some length of fastener assembly.

It is a further object of the invention to provide an improved foraminous electrode structure which will insure contact with each individual fastener element of a fastener assembly carried by the electrode during electrolytic treatment.

These and other objects of the invention relating to details of construction of slide fastener assemblies and to apparatus employed in the treatment thereof as well as to methods involved in the manufacture and treatment thereof are fully set forth in the following description relating to the accompanying drawings in which.

Figure 1:
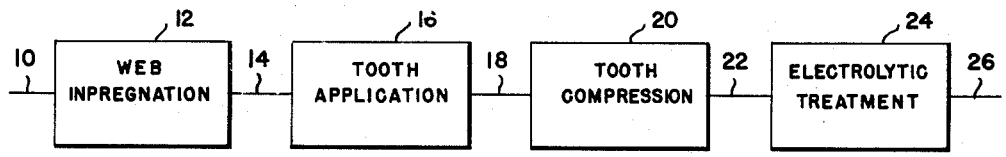
Figure 1 is a diagrammatic showing of the various operations sequentially performed in the production of a slide fastener in accordance with my invention.

Figure 1 shows diagrammatically the sequence of the operations performed in slide fastener manufacture as hereinafter described. At 10 there is indicated a tape of material suitably employed as a slide fastener tape. At 12 there is indicated tape impregnating means suitable for binding loose fibers and threads extending from the tape. The impregnated tape leaving the impregnating means 12 is indicated at 14 and passes to slide fastener element applying apparatus 16 in which fastener elements of improved formation and with a conductive wire positioned thereunder are affixed to the tape. After elements have been applied to the tape, the individual tape or a pair of tapes assembled into a slide fastener with inter-engaging elements pass, as indicated at 18, to tooth compression apparatus 20 in which the fastener elements are compressed to insure engagement thereof with the conductor positioned thereunder. The individual fastener tape or assembled fastener tapes leaving the tooth compression apparatus pass, as indicated at 22, to electrolytic treatment apparatus 24 in which the metallic fastener elements are treated. The tape carrying the treated fasteners emerging from the electrolytic treatment apparatus, as indicated at 26, passes to suitable collection apparatus such as a reel not shown in the drawing.

Figure 2:
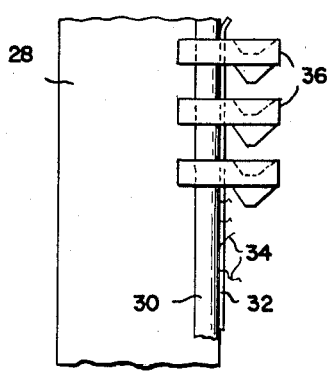
Figure 2 is a fragmentary showing of a fastener tape and elements attached thereto illustrating one of the problems encountered in slide fastener manufacture.

In Figure 2 there is shown a slide fastener tape 28 provided with a bead-forming portion 30 and having a conductive wire 32 positioned adjacent to the outermost edge of the bead. As indicated at 34, small fibers or threads extending from the edge of the tape frequently extend beyond the wire 32. When fastener elements such as indicated at 36 are applied to the tape, the small fibers or threads 34 are occasionally caught between the fastener elements 36 and the conductive wire 32 serving to insulate an element from the wire. I have found two ways in which this objectional condition could be avoided.

Figure 3:
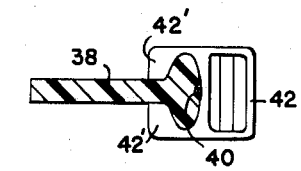
Figure 3 is a transverse section through a tape having a fastener element attached thereto and illustrating an improved fastener construction.

This objectional condition could be avoided by providing a fastener tape which does not have fibers or threads extending therefrom. This may be accomplished by employing, as indicated at 38 in Figure 3, a plastic, rubber or other suitable non-fibrous tape which cannot present fibers which may serve to insulate a conductive wire 40 from a fastener element 42 clamped to the non-fibrous tape 38.

Figure 4:
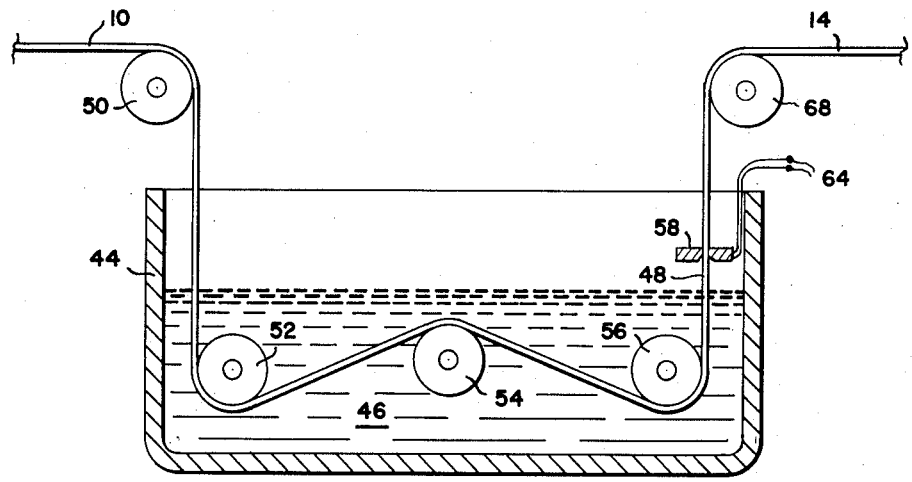
Figure 4 is a sectional diagram of apparatus providing a bath for the treatment of slide fasteners.
Figure 5:
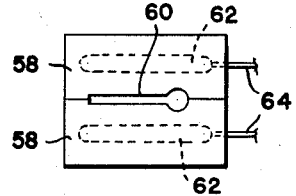
Figure 5 is a fragmentary showing of a portion of the apparatus shown in Figure 4.

In place of merely using a non-fibrous tape, a conventional woven or other fibrous tape may be employed and, by suitable treatment, may be rendered non-fibrous. Apparatus for accomplishing this is shown in Figures 4 and 5 and includes a suitable container 44 containing a bath of impregnating liquid material 46. The impregnating liquid may provide for impregnation of the tape by means of a wax carried in a suitable solvent in the bath or various resinous or other suitable plastic materials either in solution or in liquid form.

A tape 10, as indicated at Figure 4, passes over a suitable guide roller 50 and into the bath 46 wherein, by passage over a succession of rollers 52, 54 and 56, it is flexed so as to insure impregnation thereof by the liquid in the bath. As the tape is withdrawn from the bath as indicated at 48, it is desirably carried through suitable scraping means such as, for example, a pair of cooperating die blocks 58 serving to scrape the surplus treating liquid from the tape and to brush down any fibers extending from the surface of the tape.

A plan view of the die blocks 58 is shown in Figure 5. The die blocks are provided with mating surfaces similarly recessed so as to provide an opening 60 through which the tape is drawn with the dimensions of the opening being selected to provide the necessary scraping and/or pressing of the tape. If desired, the die blocks may be provided with heating elements 62 connected by means of suitable conductors 64 to a suitable current source and a conventional current and temperature control apparatus.

It will be evident that in place of a bath type of treatment, liquid spraying, dusting or other means may be employed for impregnating the tape with suitable binding means or for applying a coating to the tape. The tape may be passed through a variety of apparatus of different forms providing, in effect, the scraping of surplus material from the tape, the pressing of material into the tape and the brushing down of fibers and threads extending from the tape. The net effect of the apparatus shown in Figure 4, and of similar apparatus, is to provide a treated tape, such as that shown at 14 in Figure 4 passing over a discharge roll 68, in which all stray fibers or threads are pressed down and bonded to the surface of the tape. Such a tape would, at the time of assembly of slide fastener elements thereto, be effectively in the form of the tape 38 shown in Figure 3 in which all possibility of the application of fasteners 36 separated from the conductor 40 by means of stray threads or fibers 34 would be avoided.

As previously noted, the treatment of slide fasteners includes the passage of the fasteners through an electrolytic bath. The tape impregnation discussed above provides incidental additional benefit in that it prevents the tape from becoming saturated by the electrolyte in subsequent electrolytic treatments and prevents the carrying over of treatment solutions from one treatment bath to a subsequent treatment bath such as, for example, from an electrolyte into a rinsing bath. For example, after the treatment of elements has been completed, the tape impregnating materials may be removed therefrom if desired and if removable impregnating materials such as waxes or other soluble materials have been employed.

It is further contemplated in accordance with my invention to provide fastener elements of improved formation so as to insure electrical contact between the elements and the conductive wire. Not only do stray fibers and random foreign matter occasionally produce an insulating barrier between an element and the conductive wire but sometimes oxide coatings or similar films on the surface of the wire and/or the fastener elements present an insulating barrier which is not mechanically broken upon the application of a conventionally formed fastener element to the tape.

Figures 6, 7:
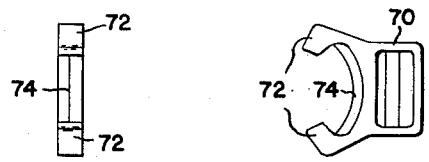
Figure 6 is a plan view of a fastener element of improved construction.
Figure 7 is a view of the left-hand end of the element shown in Figure 6.

In Figures 6 and 7 there is shown a fastener element of improved structure which provides a sharp edge capable of cutting or penetrating random foreign matter, oxide films and other possible means providing a conductive barrier between a fastener element and a conductive wire. Referring to Figures 6 and 7, there is shown an improved fastener element 70 provided with a pair of legs 72 adapted to be crimped around the bead of the fastener tape in the matter of the legs 42' of the fastener 42 shown in Figure 3. The base of the recess formed between the legs 72 in the improved fastener shown in Figures 6 and 7 is provided with an upstanding sharp edge or ridge 74 extending transversely between the legs 72 and positioned so as to extend transversely of a conductive wire, such as the wire 40 shown in Figure 3 when the element 70 is crimped to a fastener tape over such a wire. It will be evident that the sharpened ridge 74 will provide substantially a line contact of high loading between the fastener element and a wire and the resulting indentation and deformation of the wire accomplished by the relatively high loading will, in almost every case, be effective to break through oxide or other insulating films and to sever or displace foreign insulating matter.

Figure 8:
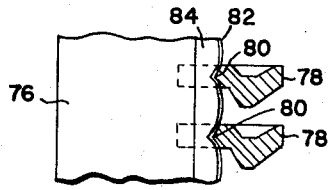
Figure 8 is a fragmentary showing of a fastener tape having elements of the type shown in Figures 6 and 7 attached thereto.

In Figure 8 there is shown, partially in section, a fragmentary portion of a fastener tape 76 carrying fastener elements 78 provided with sharpened ridges 80 bearing against and depressing a wire 82 positioned between the elements and the bead 84 of the tape 76. It will become evident upon viewing Figure 8 that the structure described provides a much more reliable and uniform contact between the elements and the wire than is provided, for example, by the conventional fastener structure as shown in Figure 2.

It will also be evident that in place of the single sharpened ridge 74, there may be provided a serrated surface or a surface employing a plurality of ridges or points, and that any of these and similar structures hereinafter referred to as providing sharpened edges will insure a higher degree of uniformity of electrical contact between the fastener elements and a conductor positioned thereunder than is obtained by conventional fastener assemblies constructed as shown in Figure 2.

It is noted that various apparatus may be employed for applying the fastener elements to the fastener tape. Such apparatus is referred to in my copending application, Serial No. 639,817, filed February 13, 1957, and in the patent to Sundebach 2,141,200 and other patents. The striking and forming apparatus shown in the above-mentioned application and patent may quite obviously be made to produce a fastener element of the formation of the element shown in Figures 6 and 7.

Regardless of whether there is employed a conventional fastener or the improved fastener shown in Figures 6 and 7, it is desirable to restrike the elements after they are applied to the fastener tape in order to additionally deform the elements in such a manner as to further insure uniform contact between the element and the conductive wire positioned thereunder and insure penetration of random foreign matter, threads, fibers, oxide or other films and the like providing a conductive barrier between a fastener element and the wire. Alternative arrangements for accomplishing restriking and deformation will now be described in connection with Figures 9, 10 and 11.

Figure 9:
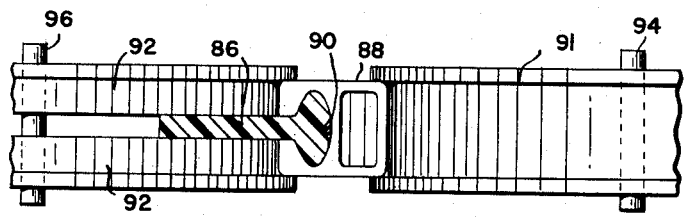
Figure 9 is a transverse section through a fastener tape having a fastener element attached thereto and showing means for deforming the element to insure contact between the element and a conductive wire positioned between the element and the fastener tape.

In Figure 9 there is shown a fastener tape 86 to which there has been applied elements such as the fastener element 88 crimped over a conductive wire 90 positioned on the outer face of the tape bead. Opposed flanged rolls 91 and 92 are positioned to engage opposite faces of the element 88 and are mounted on shafts 94 and 96, respectively. The shafts are mounted on suitable bearings not shown. The rolls are so constructed as to apply, against the opposing faces of the fastener element, sufficient force transversely of the width of the tape to deform the element slightly and to reduce its dimension in the direction extending transversely of the tape 86. This deformation or upsetting will cause the metal of the fastener to flow sufficiently in the region of the bead of the tape 86 to provide, in most cases, for a reliable contact between the fastener element and the conductor 90 when such contact may not have been theretofore reliable due to the existence of an oxide film, foreign matter, a stray thread or fiber or simply because of the fact that the element, as originally applied to the tape, failed to bear upon the conductor with sufficient force. It will be evident that the ridged fastener element described in connection with Figures 6 and 7 is particularly adapted to benefit by a restriking operation due to the existence of the sharpened edge contact between the element and the wire.

Figure 10:
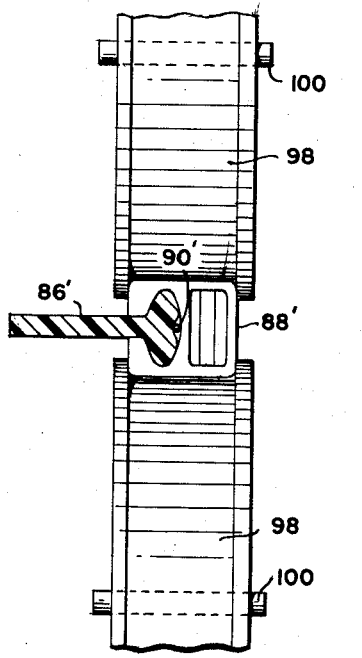
Figure 10 is an alternative form of apparatus for deforming a fastener element to insure contact between the element and a conductive wire positioned between the element and the fastener tape.

While the arrangement shown in Figure 9 serves to apply force to the fastener elements in a direction extending transversely of the width of the fastener tape, alternative apparatus may be employed, as shown in Figure 10. This apparatus includes a pair of flanged rolls 98 mounted on shafts 100 and adapted to apply force to the elements 88' in a direction extending transversely of the thickness of the fastener tape 86'. Deformation or upsetting in this direction will also serve to provide for a flow of the metal of the fastener element insuring more reliable contact with the conductor wire. The elements 88' are also particularly desirably constructed in accordance with the element described in connection with Figures 6 and 7.

Figure 11:
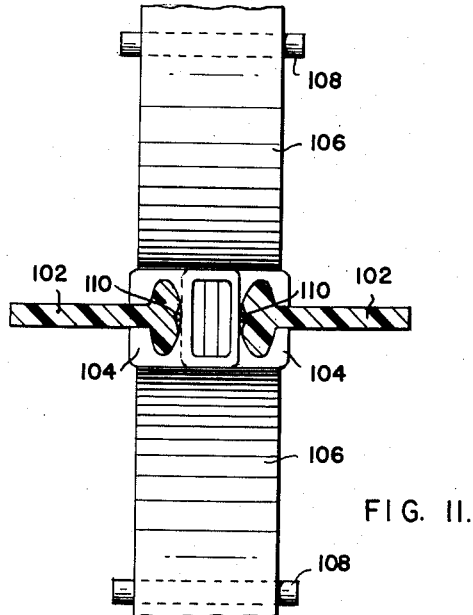
Figure 11 is a transverse section through an assembled fastener showing inter-engaging fastener elements and means for deforming the elements in order to insure contact between each individual element and conductive wire positioned between the element and the tape to which it is attached.

Another alternative arrangement for providing deformation of the fastener elements is shown in Figure 11 in which a slide fastener assembly including a pair of tapes 102 having inter-engaging fastener elements 104 affixed thereto over wires 110 are passed between sets of rolls 106 mounted on shafts 108 for providing deformation producing forces upon the inter-engaging fastener elements in a direction extending transversely of the thickness of the tapes. This arrangement provides not only for insuring uniformity of contact between the elements and a conductor 110 positioned between the elements and their respective tapes but also insures uniformity of engagement between adjacent inter-engaging fastener elements. While each element is being deformed, it will be in engagement with its adjacent elements. Due, however, to normal spring-back, upon the passage of the elements from the rolls, a uniform clearance between adjacent inter-engaging elements will result. This uniform clearance is important for reasons which will hereinafter be described.

It may be noted that the size of the wire will be dependent upon the size of the fastener tooth and, more particularly, the area of the surface of the tooth engaging the wire. The wire size is also determined by the thickness and deformability of the tape bead and the physical characteristics of the wire itself such as, for example, flexibility, conductivity and the like. Typical wire diameters range from .008 to .014".

While the rolls 91 and 92 shown in Figure 9, rolls 98 shown in Figure 10 and rolls 106 shown in Figure 11 have been merely described as being rotatable, it will be evident that they may be rotated by passage of elements or may be driven in synchronism with the rate of tape advance if desired.

Figure 12:
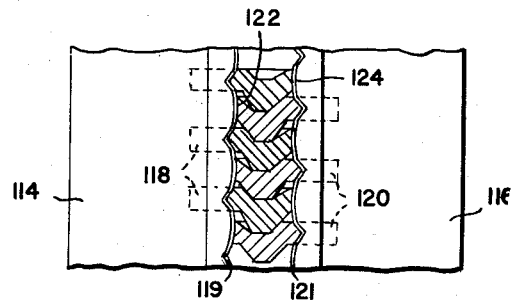
Figure 12 is a fragmentary partially cutaway showing of an assembled slide fastener constructed to provide contact between the elements on one tape and a conductive wire positioned between the cooperating tape and elements attached thereto.

In Figure 12 there is shown a partially cutaway side view of an assembled fastener showing a pair of tapes 114 and 116 carrying inter-engaging fastener elements 118 and 120 respectively. The elements are formed in accordance with the showing of the elements in Figures 6 and 7 and have desirably been deformed in the manner described above in connection with Figures 9, 10 or 11. A wire 119 is positioned under the elements affixed to the tape 114 and a wire 121 is positioned under the elements affixed to the tape 116. The compression of the tape bead by the elements affixed thereto will cause an arching of the wires between adjacent elements clamped thereover as indicated at 122 and 124.

In the fastener assembly shown in Figure 12, the lengths of the fastener elements extending outwardly from the tape to which they are attached and the degree of deformation of the tape bead and wire resulting from attachment of elements thereover is selected so as to produce a loaded engagement between the elements on each tape and the wire on the cooperating tape as indicated at 122 and 124. Flexing of the assembled tape, as will occur, for example, upon passage of the tape over guide rolls, will provide a degree of motion between the engaging surfaces of the fastener elements and the conductor on the adjacent element. This relative motion under load will serve to remove oxide film and foreign matter from these surfaces and insure electrical contact therebetween.

The striking described above in connection with Figure 11 will provide uniformity of clearance between adjacent fastener elements and there will thus be uniform loading between inter-engaging fastener elements resulting from the deformation of the wire. This uniform loading will insure reliable and uniform electrical contact between the inter-engaging fastener elements. It may be noted that in some cases the structure shown in Figure 12 may be employed with only a single conductive wire such as, for example, only the wire 119 being employed and the wire 121 being omitted, conductive contact to the elements on the tape 116 being insured by the conductive contact of the elements on the tape 116 with the wire 119 and with the elements 118 on the tape 114.

Figure 13:
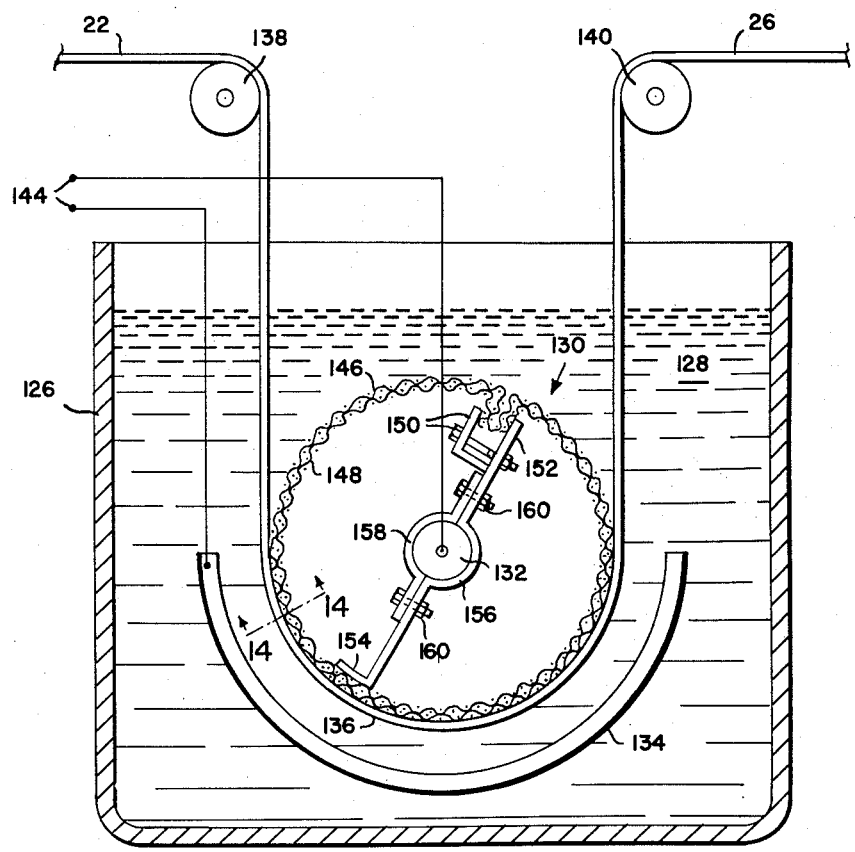
Figure 13 is a sectional diagram of apparatus for the electrolytic treatment of slide fasteners.

After a tape or assembled tapes have been produced in accordance with the foregoing, they are passed through an electrolytic bath, such a bath is shown in Figure 13 and includes a suitable container 126 carrying an electrolytic solution 128. A rotatable drum indicated generally at 130 is mounted on a shaft 132 and will hereinafter be described in greater detail. Positioned in uniformly spaced relation with the drum 130 is a stationary electrode 134. A fastener tape or pair of tapes carrying fastener elements shown at 22 passes over a guide roll 138 and passes into the electrolytic bath 128 and around the drum 130 as indicated at 136. The treated fastener passes out of the bath and around a guide roll 140 from which the treated tape 26 may be carried to successive treatment baths and onto suitable storage means.

A suitable source of current providing for the desired electrolytic treatment is connected to terminals 144 from which it passes through conductors to the stationary electrode 134 and to the shaft 132. The current passes from the shaft 132 to the surface of the drum 130 through structure which will hereinafter be described and passes from the surface of the drum 130 to elements carried by the fastener tape passing around the drum 130.

The drum indicated generally at 130 is formed of an outer layer of a suitable foraminous material 146, which will be hereinafter described, supported by a suitable foraminous backing material 148 which will also be hereinafter described.

The materials 146 and 148 are of substantially sheet form and are formed into a cylinder over which the fastener tapes to be treated are passed. While extent of engagement between the tapes and the drum is shown in the drawing as being over only half the circumference of the drum, it will be evident that the extent of contact between the tape and the drum may be increased substantially, if desired, by the employment of additional guide rolls. The diameter of the drum and the extent of contact of the tape with the drum may be selected in relation with the speed of rotation of the drum to provide a desired time of the treatment of the fastener elements in the electrolytic bath.

The ends of the layers of foraminous drum forming material are clamped under a clamping arrangement in the form of an angle and bolts indicated at 150 in cooperation with radially transversely extending plate 152 which is formed at its opposite radial end with a suitable foot 154 for engagement with and to provide support for the opposite side of the drum 130. The foot may, if desired, be perforated or may otherwise be spaced from the foraminous material by suitable foraminous spacing means if desired. The plate 152 is provided in its central region with a depressed portion 156 cooperating with clamp means 158 secured thereto by means of bolts 160 for attachment of the plate to the shaft 132 and providing for conductive contact between the shaft 132 and the foraminous cylinder forming materials 146 and 148. It will be evident that the various parts of the apparatus shown in Figure 13 are shown largely out of proportion in order to clarify the figure.

It will be evident that a drum, such as the drum 130, of suitable metallic construction providing for electrical contact with fastener elements will undergo electrolytic treatment in the bath. And, if the drum is formed of, for example, aluminum, and the elements are formed of aluminum, the drum will undergo the same treatment as the elements. Furthermore, when elements connected by a wire pass into a bath, such as the bath 128, and come in contact with a drum, such as the drum 130, the electrolytic treatment current will flow backwardly through the wire and cause elements entering the bath and not yet in engagement with the drum to be treated. Thus when the elements engage the drum, the engaging surfaces of both the elements and the drum carry a surface coating.

The foraminous supporting material 146 is so constructed as to provide a plurality of sharp edges or points sufficiently closely spaced to insure contact thereof with each fastener element carried by fastener tapes passing over the drum. The edges or points are sufficiently sharp or pointed that, in combination with the force of engagement of the elements with the drum resulting from tension of the tape passing thereover, the sharp edges or points will pierce an oxide or other coating on the elements and on the drum, i.e., on the edges or points themselves, in order to insure reliable contact between each individual fastener element and the drum.

Figure 14:
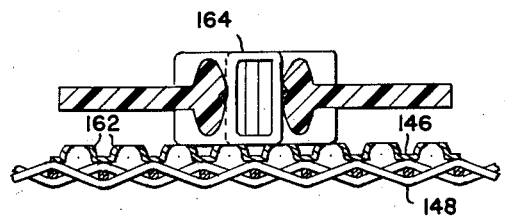
Figure 14 is an enlarged fragmentary transverse section through a fastener assembly taken on the trace 14—14 of Figure 13.

Figure 14 is an enlarged fragmentary transverse section taken through the drum forming materials 146 and 148 and a fastener passing thereover as indicated at 14—14 in Figure 13. The outer surface forming material 146 is a relatively thin sheet of material which is provided with truncated dimples 162. Such a sheet may be formed by dimpling and removing the tops of the dimples or, alternatively, by perforating and then providing dimples centered on each of the perforations. The truncated dimples 162 are sufficiently closely spaced to insure contact between each fastener element 164 and the sharp edges formed by at least one truncated dimple. In order to provide sharp edges, the sheet forming the material 146 is preferably quite thin and requires support. A suitable supporting surface may be formed by, for example, a wire screen 148 which will provide a sufficiently porous backing to permit flow of electrolytic and gas bubbles therethrough.

As previously noted, the sharp edges of the truncated dimple will cut through the film produced on the fastener elements during their previous handling and during their passage through the electrolyte and prior to their engagement to the treating drum 130. The sharp edges will also cut through their own film, i.e., the film produced on the edges, prior to their engagement with the fastener elements. Thus the sharpened edges insure uniform and reliable contact between the treating drum, i.e., one electrode, and each of the elements to be treated.

Figure 15:
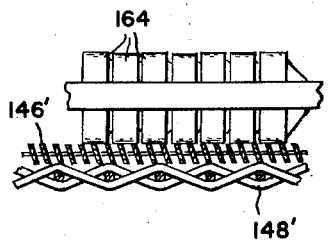
Figure 15 is an enlarged fragmentary longitudinal section through a fastener assembly showing a structure which may be alternatively employed in place of that shown in Figure 14.

An alternative structure is shown in Figure 15 in which a sheet of louvered metal 146' is employed to provide sharp edges for engagement with the fastener elements 164. This figure shows a fragmentary enlarged section extending longitudinally of a fastener passing over the drum 130. The louvered sheets may be, for example, louvered aluminum sheets such as are commonly employed to provide window screening having the characteristics of Venetian blinds.

Similar louvered metal structures may be employed. Expanded metal may be employed to provide sharp edges for engagement with the fastener elements. The expanded metal referred to is of the conventional diamond pattern of well-known construction such as is commonly employed for gratings, metal lath and similar applications. In this application the thickness of the sheet employed is sufficiently small and the size of the diamond openings expanded therein is such as to insure the presentation of sufficiently closely spaced sharp edges to insure engagement of each fastener element with at least one sharp edge.

Louvered or expanded metal of sufficiently thin gauge suitable for this application requires backing in order to retain it in desired cylindrical form. Such backing may be provided by screening as indicated at 148' in Figure 15 or, alternatively, may be a sheet of heavier gauge expanded metal or other suitably stiff and suitably foraminous material which will both support the contact forming material and provide for the passage of electrolyte and gas bubbles therethrough. Such alternative backing materials may also, if desired, be employed in the place of the wire screen 148 discussed above in connection with Figure 14.

It will be evident that the structures described in connection with Figures 13, 14 and 15 may be variously formed provided the structure serves to present sufficiently sharp points or ridges for contact with the fastener elements, and to present points or ridges spaced sufficiently close together to insure contact with each fastener element. Such a structure will serve to insure uniformity of electrical contact with each of the fastener elements during electrolytic treatment thereof.

It will be evident that the sharp edged or pointed drum structure may desirably be employed in the treatment of fastener elements positioned over wires and secured to tapes such as the moulded or treated tapes discussed above in connection with Figure 3. Further insurance of reliable electrical contact with each fastener is provided if fastener elements such as those described in connection with Figures 6 and 7 are employed. Uniformity of treatment is still further insured if fastener elements are deformed as described in connection with Figures 9, 10 and 11, and still further insurance of uniformity of treatment is provided by the employment of the arched wire element engaging assembled fastener structure as was described in connection with Figure 12. It should be noted that effective electrical contact forming engagement between the arched wires and the elements is required only during the treatment of the fastener elements. The relaxing of the contact loading, which will occur after the fasteners have been opened and closed a few times, is of no consequence for the reason that the fasteners remain closed after their first closure until all electrolytic treatments have been completed.

It should be noted that while the drum indicated generally at 30 is disclosed in connection with Figure 13 as providing continues fastener treatment, the drum may be employed for batch treatment of fasteners. In such an arrangement the drum would be removable and would be of sufficient length to provide for a plurality of convolutions of a fastener thereon. In such an arrangement the sharp projections on the drum surface would have utility in breaking through previously formed films existing on the fastener elements and in breaking through films formed on the projections during previous fastener treatment.

What is claimed is:

1. A slide fastener particularly adapted for electrolytic treatment including a pair of tapes, fastener elements affixed to each of said tapes, the fastener elements of the two tapes being in intermeshing relation, and a conductor positioned between at least one of said tapes and the fastener elements affixed thereto for providing electrical connection between said elements affixed to said one tape, said conductor being arched between fastener elements and engaging the fastener elements affixed to the other tape to provide electrical contact therewith.

2. A slide fastener particularly adapted for electrolytic treatment including a pair of tapes, fastener elements affixed to each of said tapes, the fastener elements of the two tapes being in intermeshing relation, and a conductor positioned between at least one of said tapes and the fastener elements affixed thereto for providing electrical connection between said elements affixed to said one tape, said conductor being arched between fastener elements and engaging the fastener elements affixed to the other tape to provide electrical contact therewith and said engagement providing a force urging the intermeshing teeth into engagement with each other to provide electrical contact therebetween.

3. A slide fastener particularly adapted for electrolytic treatment including a pair of tapes, fastener elements affixed to each of said tapes, the fastener elements of the two tapes being in intermeshing relation, and a conductor positioned between at least one of said tapes and the fastener elements affixed thereto for providing electrical connection between said elements, said last mentioned elements being formed with sharpened edges positioned to engage said conductor, said conductor being arched between fastener elements and engaging the fastener elements affixed to the other tape to provide electrical contact therewith and said engagement providing a force urging the intermeshing teeth into engagement with each other to provide electrical contact therebetween.

References Cited in the file of this patent

UNITED STATES PATENTS

| | | |
|---|---|---|
| 1,870,873 | Rutherford | Aug. 9, 1932 |
| 2,063,515 | Morin | Dec. 8, 1936 |

(Other references on following page)

UNITED STATES PATENTS

| | | |
|---|---|---|
| 2,264,326 | Morin | Dec. 2, 1941 |
| 2,287,324 | Poux | June 23, 1942 |
| 2,496,946 | Legat | Feb. 7, 1950 |
| 2,522,072 | Tierney | Sept. 12, 1950 |
| 2,525,284 | Camp | Oct. 10, 1950 |
| 2,572,838 | Cohn | Oct. 30, 1951 |
| 2,583,035 | Winterhalter | Jan. 22, 1952 |
| 2,591,042 | Berman et al. | Apr. 1, 1952 |
| 2,594,691 | Simpson | Apr. 29, 1952 |
| 2,596,888 | Cohn | May 13, 1952 |
| 2,651,092 | Poux | Sept. 8, 1953 |
| 2,684,514 | Basel et al. | July 27, 1954 |
| 2,685,127 | Kaufmann | Aug. 3, 1954 |
| 2,690,424 | Hassell | Sept. 28, 1954 |
| 2,739,931 | Beanstiel | Mar. 27, 1956 |
| 2,743,513 | Lange | May 1, 1956 |
| 2,744,313 | Warburton et al. | May 8, 1956 |
| 2,793,993 | Stock et al. | May 28, 1957 |
| 2,804,669 | Soave | Sept. 3, 1957 |

FOREIGN PATENTS

| | | |
|---|---|---|
| 641,976 | Great Britain | Aug. 23, 1950 |